United States Patent
Wisch et al.

(10) Patent No.: US 7,246,771 B2
(45) Date of Patent: Jul. 24, 2007

(54) LIFTING DEVICE FOR A LUGGAGE COMPARTMENT IN AN AIRCRAFT, AS WELL AS AIRCRAFT WITH A LIFTING DEVICE FOR A LUGGAGE COMPARTMENT

(75) Inventors: Bodo Wisch, Bremen (DE); Lars Rowold, Wiefelstede (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/022,114

(22) Filed: Dec. 23, 2004

(65) Prior Publication Data

US 2005/0211834 A1 Sep. 29, 2005

(30) Foreign Application Priority Data

Dec. 30, 2003 (DE) ................ 103 61 830

(51) Int. Cl.
*B64D 11/00* (2006.01)
(52) U.S. Cl. .................... 244/118.5; 312/245
(58) Field of Classification Search ............. 244/118.1, 244/118.5, 129.1; 312/245, 248, 325, 319.6; 307/125
See application file for complete search history.

(56) References Cited

U.S. PATENT DOCUMENTS

| 2,999,683 | A | | 9/1961 | Pickles ................ 268/74 |
|---|---|---|---|---|
| 3,451,655 | A | * | 6/1969 | Scott .................... 254/7 R |
| 5,441,218 | A | | 8/1995 | Mueller et al. .......... 244/118.1 |
| 5,456,529 | A | * | 10/1995 | Cheung ..................... 312/245 |
| 5,483,849 | A | | 1/1996 | Orii et al. .................... 74/506 |
| 5,567,028 | A | | 10/1996 | Lutovsky et al. .......... 312/246 |
| 5,820,076 | A | | 10/1998 | Schumacher et al. .... 244/118.5 |
| 5,850,113 | A | * | 12/1998 | Weimer et al. .............. 307/125 |
| 6,910,677 | B1 | * | 6/2005 | Miller et al. ................ 254/126 |
| 2001/0011692 | A1 | | 8/2001 | Sprenger et al. .......... 244/118.5 |

FOREIGN PATENT DOCUMENTS

| DE | 4130644 | 6/1993 |
|---|---|---|
| DE | 42 09 037 A1 | 9/1993 |
| DE | 195 40 929 A1 | 5/1997 |

* cited by examiner

*Primary Examiner*—Rob Swiatek
(74) *Attorney, Agent, or Firm*—Ostrolenk, Faber, Gerb & Soffen, LLP

(57) ABSTRACT

The application concerns a lifting device for a luggage compartment in an aircraft, wherein the luggage compartment can be moved between an open and closed position, and the lifting device includes a power generation element that exerts a lifting force on the luggage compartment. The application also concerns an aircraft with a lifting device for a luggage compartment. The power generation element is an electrical power generation element, and the lifting device has a rechargeable energy accumulator to store energy for operation of the electrical power generation element.

20 Claims, 4 Drawing Sheets

Figure 1:
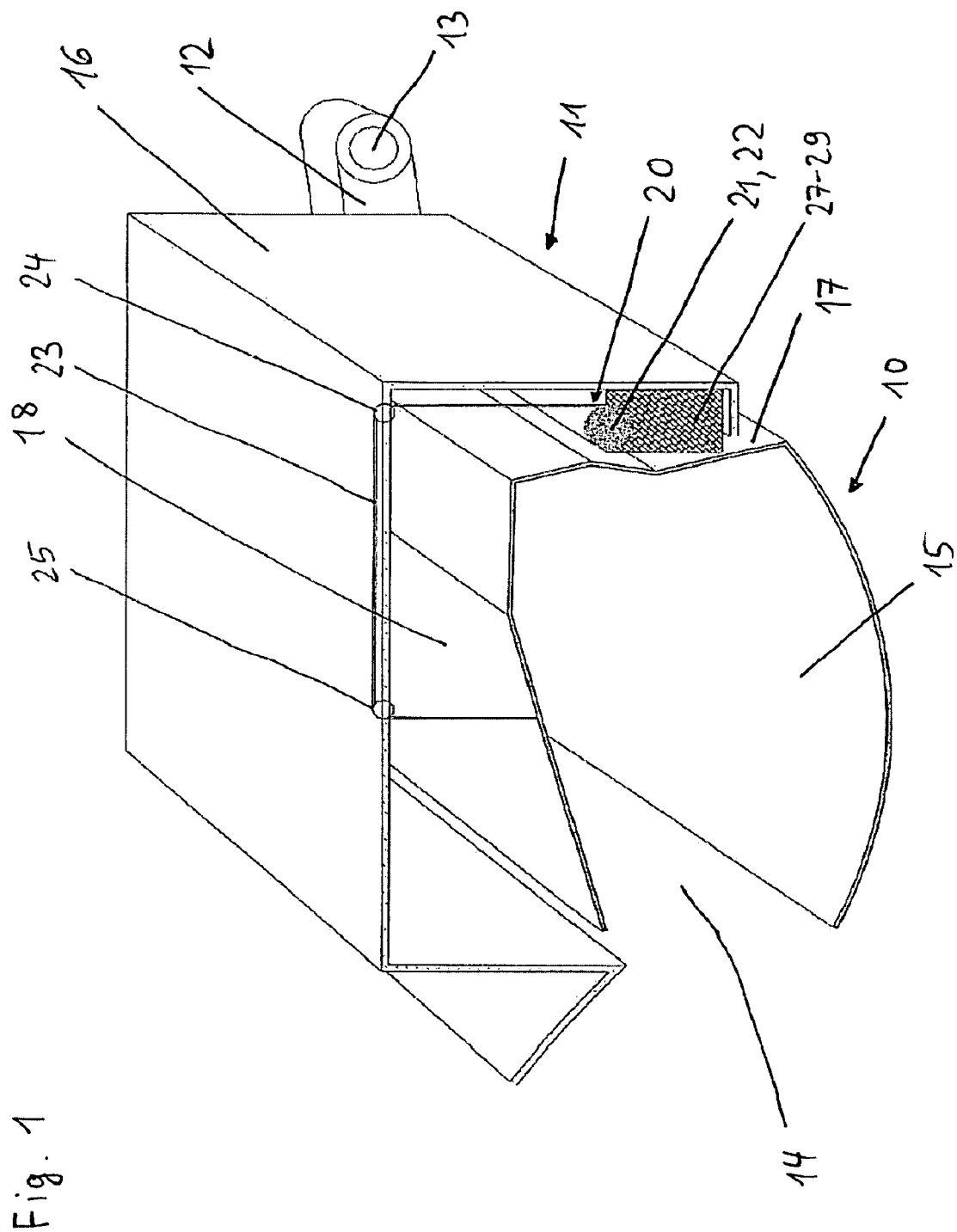

LIFTING DEVICE FOR A LUGGAGE COMPARTMENT IN AN AIRCRAFT, AS WELL AS AIRCRAFT WITH A LIFTING DEVICE FOR A LUGGAGE COMPARTMENT

TECHNOLOGICAL BACKGROUND

DE 41 30 644 and U.S. Pat. No. 5,567,028 describe a luggage compartment with opening aids.

FIELD OF THE INVENTION

The invention relates to a lifting device for a luggage compartment in an aircraft.

SUMMARY OF THE INVENTION

According to an exemplary embodiment, the luggage compartment can be moved between an opened and closed position, and the lifting device includes a power generation element that exerts a lifting force on the luggage compartment. The invention also concerns an aircraft with a lifting device for a luggage compartment.

The invention, in particular, concerns movable luggage compartments arranged in commercial aircraft above the rows of seats. To move a luggage compartment from an open position to a closed position, a mechanical power generation element that supports the luggage compartment can be provided to assist the user, especially a gas-filled spring (DE 41 30 644 C2, U.S. Pat. No. 5,567,028). However, the required remaining force must be applied manually by a user. In addition, such arrangements, because of the limited lifetime of gas-filled springs, are maintenance-intensive. Depending on the weight of the load, an adjustment of the spring force can be required, which might require a weight sensor for the loading weight.

Pneumatic power generation elements require costly devices for compressed air generation in the aircraft.

Electrical power generation elements, especially electric motors, require a certain power demand for closure of the luggage compartment without outside force. With the number of luggage compartments provided in an aircraft, this can lead to extraordinary loading of the electrical system at times. The supply lines from the electrical system to the electric motors must be laid out for high current intensities and therefore have high weight.

To reduce these drawbacks, an electric motor with a lower power demand may be used and the remaining force for closure of the luggage compartment may be generated by means of a mechanical power generation element, especially a gas-filled spring. Such arrangements, however, are maintenance-intensive, because of the limited lifetime of the gas-filled springs.

An exemplary embodiment of the present invention may provide for a lifting device for a luggage compartment in an aircraft that is low-maintenance and reduces the load on the electrical system, as well as preferably has a limited weight and is user-friendly.

According to an exemplary embodiment of the present invention, the power generation element is an electrical power generation element, and the lifting device has a rechargeable energy accumulator to store energy for operation of the electrical power generation element. Owing to the use of an electrical power generation element, maintenance-intensive mechanical power generation devices, especially gas-filled springs, can be dispensed with. The high power required to close the luggage compartment over a short time can be taken from the energy accumulator without loading the electrical system. The energy accumulator can preferably be recharged via the electrical system after removal of the electrical power.

The energy accumulator is preferably charged from the electrical system of a relatively longer period with a reduced charge power or current intensity, so that the load on the electrical system is reduced. Because of the smaller charge current intensity, the connection lines between the lifting device and the electrical system can have a small cross section and therefore low weight. To charge the energy accumulator with power from the electrical system, the lifting device expediently has a corresponding charging device. The charging power of the charging device is preferably much lower than the power demand of the electrical power generation device. "Much smaller" means at least by a factor of 2, preferably smaller by at least a factor of 5.

The weight force support is preferably exclusively electric. The electrical power generation device allows the luggage compartment to be fully closed without outside force support, which increases user friendliness.

Preferably, each luggage compartment of an aircraft has its own energy accumulator. A number of decentralized energy accumulators is therefore involved. This makes it possible to keep the line length laid out for high current intensity as limited as possible. It can also be expedient for a certain number of luggage compartments to provide a common energy accumulator, in order to reduce the number of energy accumulators. Electrical storage devices for the energy accumulator are particularly simple and therefore preferred, especially one or more essentially maintenance-free capacitors. A number of capacitors can be connected in series, depending on the desired output voltage. However, rechargeable batteries are also suitable, in principle, as energy accumulator. The energy accumulator is preferably adequate for at least one, preferably at least, and more preferably at least four, operating cycles, so that in the event of repeated activation of the luggage compartment, i.e., repeated opening and closing, charging of the energy accumulator need not be waited for first.

The invention pertains to movable luggage compartments and is delimited on this account from fixed luggage compartments that are opened and closed by means of a flap.

DETAILED DESCRIPTION OF EXEMPLARY EMBODIMENTS

Figure 2:
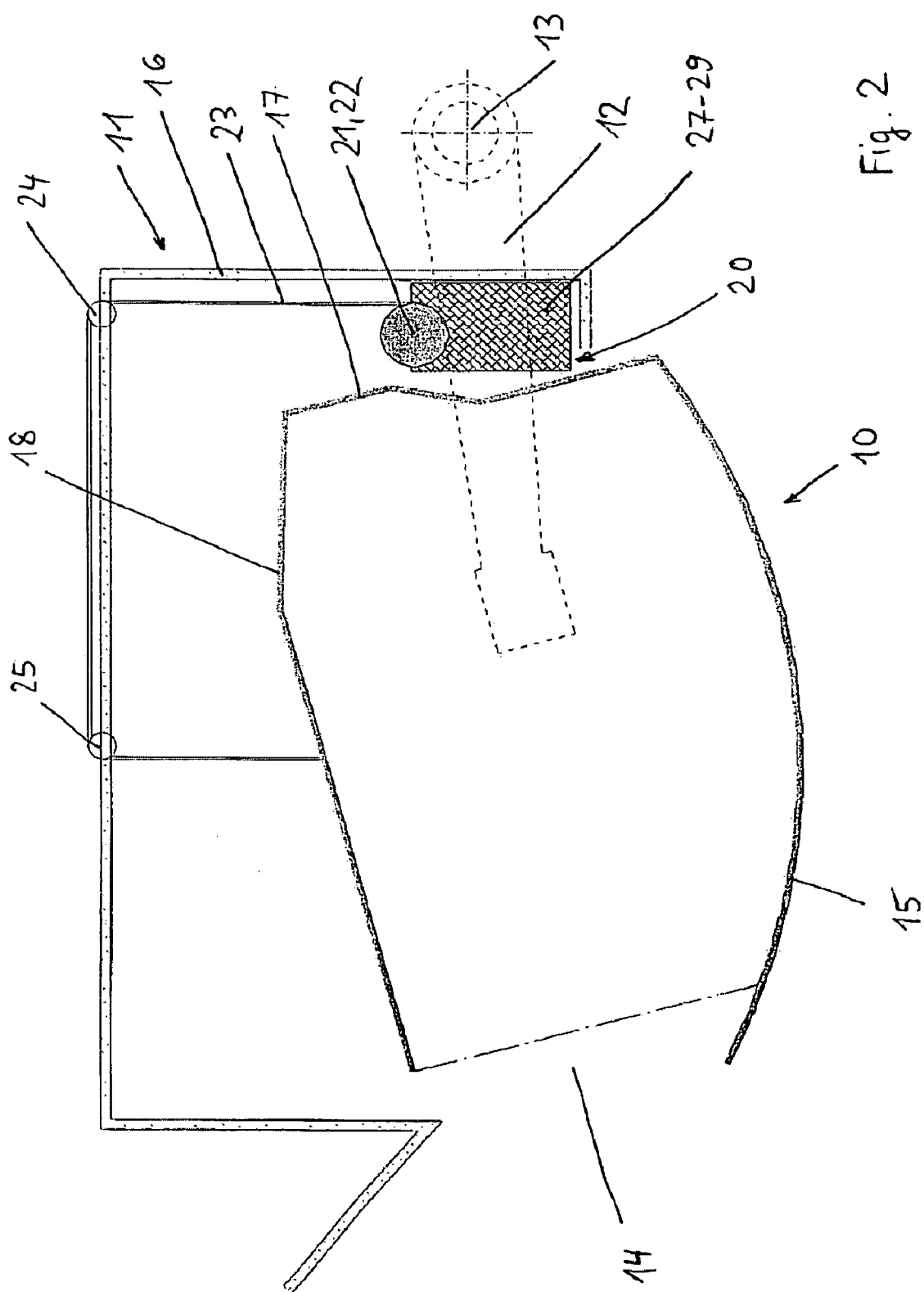
Figure 3:
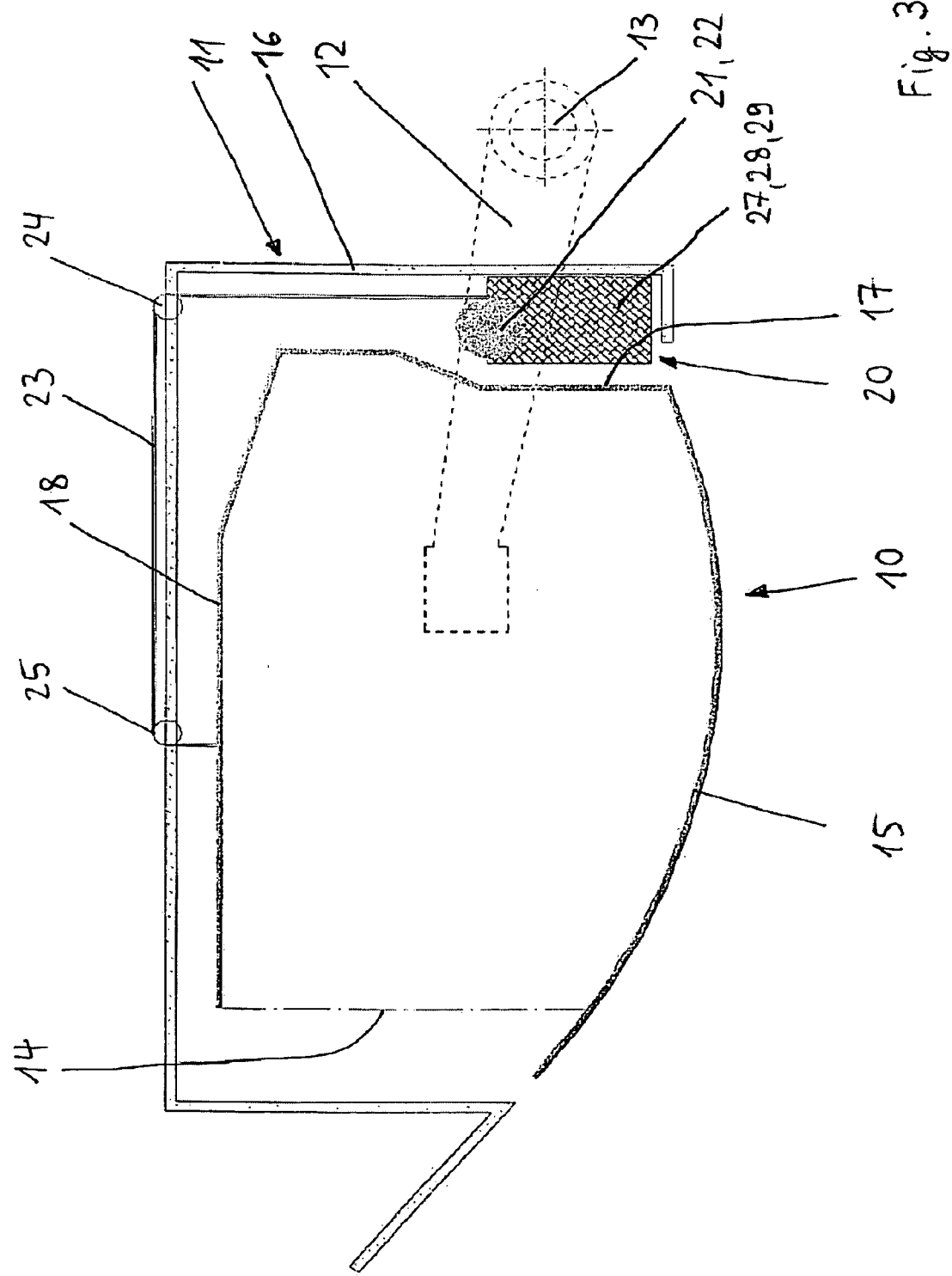
Figure 4:
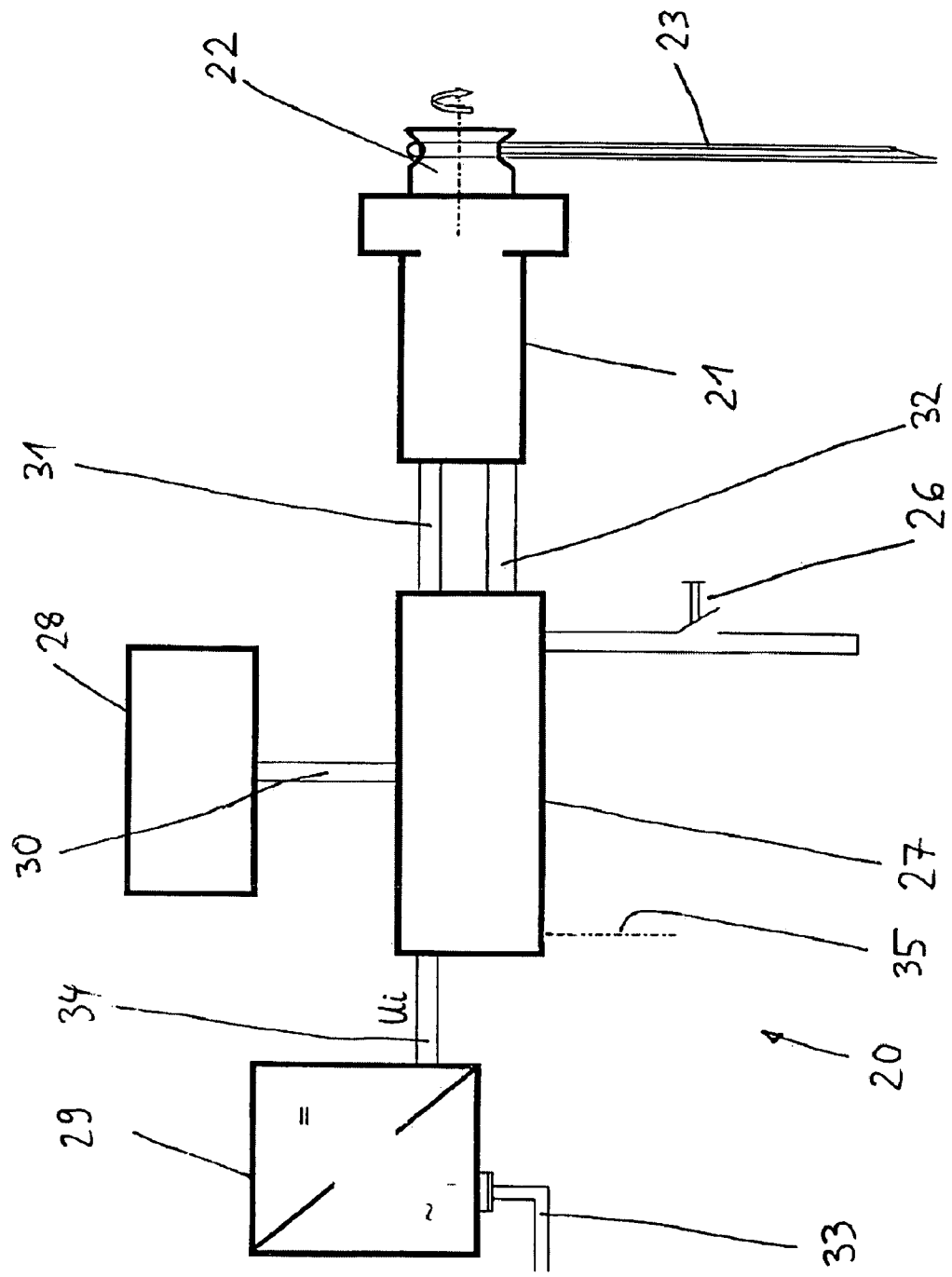

Other advantageous features are apparent from the following explanation of the invention by means of preferred variants with reference to the appended figures. In the figures:

FIG. 1: shows a perspective view of a luggage compartment in the open state;

FIG. 2: shows a cross-sectional view of a luggage compartment in the open state;

FIG. 3: shows a cross-sectional view of a luggage compartment in the closed state; and FIG. 4: shows a schematic view of a lifting device.

Luggage compartments are arranged in a longitudinal frame 11 above the rows of seats of an aircraft. A luggage compartment 10 is arranged pivotable by means of a support arm 12 relative to longitudinal frame 11 around hinge 13. In the open position depicted in FIGS. 1 and 2, the luggage compartment 10 can be loaded and unloaded through opening 14. In the closed position depicted in FIG. 3, the bottom wall 15 of luggage compartment 10 is sealed off flush with the longitudinal frame 11, in order to securely stow the luggage contained in the luggage compartment 10.

In order to move the luggage compartment 10 from the open to the closed position, a lifting device 20 is provided. The lifting device 20 comprises an electric motor 21 with a gear mechanism to drive a cable roller 22. A drive cable 23 runs around cable roller 22 via deflection rollers 24, 25 and is fastened on its end away from the motor on the top wall 18 of luggage compartment 10. The electric motor 21 is driven by means of electrical power stored in an electrical storage unit 28 and controlled by means of a control device 27. The control device 27 is supplied with a feed voltage Ui, produced, for example, by a converter 29. The converter 29 is connected to the electrical system via lines 33. Electric motor 21, control device 27, storage unit 28 and converter 29 are expediently connected to the longitudinal frame 11, for example, on a rear wall 16 of the longitudinal frame 11 behind a rear wall 17 of the luggage compartment 10. The electric motor 21 can have lines 32 for temperature monitoring for certain applications.

The luggage compartment 10 or each luggage compartment 10 has a storage unit 28. However, this is not necessarily the case; for example, one storage unit 28 could also be allocated to two or more adjacent luggage compartments. In this case, the dimensioning of the storage unit 28 would be correspondingly larger relative to the values stated below.

A switch 26 is provided on the luggage compartment 10, for example, on the bottom wall 15 or on the longitudinal frame 11. If, starting from the open position depicted in FIG. 2, the switch 26 is operated by a user, a corresponding signal is sent to the control device 27. The control device 27 optionally checks the charge status of the electrical storage unit 28. It is assumed that the charge status of the storage unit 28 is sufficient for one operating cycle of the luggage compartment 10. The control device 27 then connects the electric motor 21 to storage unit 28, in order to rotate the electric motor 21 and therefore cable roller 22 clockwise, and pull the luggage compartment 10 by means of the drive cable 23 upward into the closed position depicted in FIG. 3. In the closed position, the luggage compartment 10 can be locked by means of a lock (not shown). The switch 26 can preferably be designed as a pushbutton, which can be laid out as a simple, small and therefore inexpensive membrane switch.

Both the electric motor 21 and the storage unit 28 are dimensioned sufficiently to reliably execute the closure process without outside force support up to a maximum loading weight for the luggage compartment 10. Support of the luggage compartment 10 by the user is not required. For some applications, the electric motor 21 preferably has a power demand of more than 50 W, for example, about 80 W. Since the rotational speed or power demand of the electric motor 21 is approximately constant, i.e., independent of the loading state of the luggage compartment 10, a weight sensor for power adjustment of the electric motor 21 is unnecessary.

The storage unit 28 is dimensioned sufficiently to be able to close the luggage compartment at least five times in sequence. The electrical storage unit 28 includes one or more capacitors connected in series, set up to take off sufficiently high currents. So-called Ultra-Caps can be involved. For some applications, the capacitance of the storage unit 28, overall, is at least 50 F, for example, in the range of 100 F. The lines 30, 31 between the storage unit 28 and the electric motor 21 must have sufficient current conductance, especially a sufficient line cross section with respect to the maximum flowing current.

After unloading, the electric storage unit 28 is recharged by the control device 27, which simultaneously serves as charging device. The charging current is taken from the electrical system via lines 33. The control device 27 takes a charging current from the electrical system that is much smaller than the withdrawal current from the storage unit 28 for operation of electric motor 21. In order to reduce the load on the electrical system, the charging power is preferably, at most, 15 W, more preferably, at most, 10 W, and even more preferably, at most, 8 W. Because of this relatively limited power, no special requirements need be imposed on the dimensioning of lines 33, 34 between the electric system and control device 27, so that these can have a relatively limited line cross section and therefore relatively low weight. The same applies for dimensioning of the converter 29, which can have a correspondingly small maximum power demand. The charging power is sufficient to permit charging of the storage 28 within a limited charging period in the range of less than 600 s, preferably less than 300 s.

If the pushbutton 26 in the closed position depicted in FIG. 3 is operated by a user, a corresponding signal is sent to the control device 27. The control device 27 unlocks the luggage compartment lock, if this is preferably electrically operable. Otherwise, unlocking of the luggage compartment lock can be required instead, in addition or in combination with operation of pushbutton 26. The control device 27 then connects the electric motor 21 to storage unit 28, in order to rotate the electric motor 21 and therefore the cable roller 22 and to move the luggage compartment 10 downward by means of drive cable 23 to the open position depicted in FIG. 3. The electric motor 21 then expediently acts as a motor brake, in order to prevent return or abrupt lowering of the luggage compartment 10.

Via signal line 35 and a corresponding interface, the control device 27 can optionally be connected to a central control unit of the aircraft, for example, by an available data bus. This makes it possible to operate the luggage compartment centrally. For example, in certain phases of the flight, it can be useful to centrally close all luggage compartments of an aircraft and keep them locked, so that operation of any provided individual pushbutton 26 does not trigger an opening process of the corresponding luggage compartment 10. In addition, fully automatic control of luggage compartments 10 can occur via the central control unit, during which a user need no longer carry out activity on an individual luggage compartment for opening or closing, i.e., need no longer operate the individual pushbuttons 26. Expediently, the luggage compartment locks are therefore operable from the central control unit of the aircraft for fully automatic opening of the luggage compartments. An electromechanical, for example, electromagnetic, luggage compartment lock is preferably involved. Operation of the luggage compartments via the central control unit is also advantageous for test operation.

What is claimed is:

1. An aircraft comprising:
    at least one luggage compartment, which is movable between an open and a closed position;
    a lifting device for the at least one a luggage compartment; wherein the lifting device has a power generation element that exerts a lifting force on the luggage compartment;
    the power generation element is an electrical power generation element; and the lifting device has a dedicated rechargeable energy accumulator operable to store energy reserved for operation of the electrical power generation element.

2. The aircraft of claim 1, wherein the energy accumulator includes electrical storage devices.

3. The aircraft of claim 2, wherein the electrical storage devices include at least one capacitor.

4. The aircraft of claim 2, wherein the electrical storage devices include a number of series-connected capacitors.

5. The aircraft of claim 3, wherein the electrical storage devices include a number of series-connected capacitors.

6. The aircraft of claim 1, wherein the energy accumulator is sufficient for at least one of the operating cycles of the luggage compartment.

7. The aircraft of claim 1, wherein the power generation element is adapted to move the luggage compartment without outside force into the closed position.

8. The aircraft of claim 1, further comprising a charging device to charge the energy accumulator with power from an electrical system is provided.

9. The aircraft of claim 8, wherein the charging device has a charge power that is much lower than a power demand of the power generation element.

10. The aircraft of claim 1, wherein the power generation element is an electric motor.

11. The aircraft of claim 10, wherein the electric motor is operable in both directions of rotation.

12. The aircraft of claim 10, wherein the electric motor is operable to lower the luggage compartment as a motor brake.

13. The aircraft of claim 1, wherein the luggage compartment has at least one of a switch and a pushbutton operable for opening or closing the luggage compartment.

14. The aircraft of claim 1, wherein the lifting device has a connection to a central control unit of the aircraft.

15. The aircraft of claim 1, wherein the luggage compartment has an electrically operable lock.

16. The aircraft of claim 15, wherein the lock is operable from a central control unit of the aircraft.

17. The aircraft of claim 1, comprising a plurality of the luggage compartments; wherein each of the luggage compartments has a respective energy accumulator.

18. The aircraft of claim 1, comprising: a plurality of the luggage compartments; and one of the energy accumulators for the plurality of luggage compartments.

19. The aircraft of claim 1, wherein the energy accumulator is sufficient for at least two operating cycles of the luggage compartment.

20. The aircraft of claim 1, wherein the energy accumulator is sufficient for at least four operating cycles of the luggage compartment.

* * * * *